United States Patent [19]

Ueda et al.

[11] 4,224,197

[45] Sep. 23, 1980

[54] RUBBER COMPOSITION FOR TIRE TREAD

[75] Inventors: Akio Ueda; Shuichi Akita, both of Yokohama, Japan

[73] Assignee: Nippon Zeon Co. Ltd., Tokyo, Japan

[21] Appl. No.: 55,520

[22] Filed: Jul. 9, 1979

[30] Foreign Application Priority Data

Jul. 11, 1978 [JP] Japan ................................. 53-84373

[51] Int. Cl.$^2$ ......................... C08L 7/00; C08L 45/00
[52] U.S. Cl. ....................................... 260/5; 152/100; 152/209 P; 152/330 R; 152/374; 525/232; 525/236; 525/237; 525/241
[58] Field of Search ............... 525/237, 232, 236, 237, 525/241; 260/5

[56] References Cited

U.S. PATENT DOCUMENTS 3,827,991  8/1974  Ando et al. ............................. 260/5
3,978,165  8/1976  Stumpe, Jr. et al. ................. 525/237

*Primary Examiner*—J. Ziegler
*Attorney, Agent, or Firm*—Sherman & Shalloway

[57] ABSTRACT

A rubber composition for the tread of tire having reduced rolling resistance and increased wet skid resistance with the mechanical properties unimpaired, said rubber composition comprising 20 to 80% by weight of (I) essentially amorphous polybutadiene having a 1,2-bond units content of at least 70% and a Mooney viscosity ($ML_{1+4}$, 100° C.) of 10 to 100; 10 to 75% by weight of (II) polybutadiene rubber having a 1,2-bond units content of 20% or less and a Mooney viscosity ($ML_{1+4}$, 100° C.) of 20 to 130; and 3 to 35% by weight of (III) at least one rubber selected from styrene/butadiene copolymer rubber having a bound styrene content of 15 to 25% by weight, natural rubber, and polyisoprene rubber having a cis-1,4-bond units content of at least 90%.

3 Claims, No Drawings

RUBBER COMPOSITION FOR TIRE TREAD

This invention relates to a new rubber composition for a tire tread containing as a base material essentially amorphous 1,2-polybutadiene having a high content of 1,2-bond units.

Recently, reduction of the rolling resistance of tire and improvement of the wet skid resistance thereof, in particular, have been desired strongly from the aspects of low fuel consumption and safety of automobiles. Generally, these two properties of tire are known to be inconsistent with each other (e.g., J. of the Society of Automotive Engineers of Japan, Vol. 32 (No. 5), pp. 417-420, 1978). It has been recognized that the dynamic visco-elastic properties of a rubber composition for the tread of a tire serve as a measure of the rolling resistance of the tire. In order to reduce the rolling resistance of tire, it is necessary to use a tire tread which minimizes loss of the driving force of the car in the form of, say, heat build-up that is ascribable to load imposed on the tire running on the surface of a road, as well as to repeated deformation of the tire. Usually, tests of rubber material employ dynamic loss modulus (E"), rebound, heat build-up (as measured by a Goodrich flexometer, ASTM D623-52T), etc. as measures of the rolling resistance. To increase the wet skid resistance of tire as a wet road grip, on the other hand, it is necessary to use a tire tread which maximizes the energy loss in the form of, say, frictional resistance, resulting from deformation that the tire experiences from the fine irregularities of the surface of a road when it is made to slide on the road surface at a constant force.

To balance the two inconsistent properties—rolling resistance and wet skid resistance—with each other, a blend of a styrene/butadiene copolymer rubber and a polybutadiene rubber having a 1,2-bond units content of 20% or less has been used generally as a rubber composition for tire treads of passenger cars. The use of only the commonest styrene/butadiene copolymer rubber having a bound styrene content of 15 to 25% by weight gives relatively good wet skid resistance, but provides low rebound as a measure of rolling resistance, and also affords particularly low abrasion resistance. The styrene/butadiene copolymer rubber, therefore, has been used hitherto by blending with it 20 to 30% of a polybutadiene rubber having a low 1,2-bond units content (particularly, high cis-1,4-polybutadiene).

We made various studies in an attempt to satisfy the recent strong desire for the reduction of the rolling resistance of tire and the improvement of the wet skid resistance thereof, namely, in an attempt to obtain a rubber composition for tire treads having said two properties balanced at a higher level than the conventional blend of styrene/butadiene copolymer rubber and polybutadiene rubber. During the process of the studies, we found that a blend of as essentially amorphous polybutadiene having a high 1,2-bond units content and cis-1,4-polybutadiene rubber (disclosed in U.S. Pat. No. 3,725,331) affords a remarkable improvement in the balance between the rebound being a measure of the rolling resistance and the wet skid resistance being a measure of the wet road grip, as compared with the conventional blend of styrene/butadiene copolymer rubber and cis-1,4-polybutadiene rubber. This two-component blend, however, was almost comparable to, or rather inferior to, the conventional blend of styrene/butadiene copolymer rubber and cis-1,4-polybutadiene rubber in terms of the heat build-up in accordance with a Goodrich flexometer (ASTM D623-52T) that is another measure of the rolling resistance. That is, the two-component blend of the U.S. Patent caused greater heat build-up than the conventional blend. More serious problem with the two-component blend of the U.S. Patent was that when it is a blend of 40 to 60% by weight of polybutadiene having a high 1,2-bond units content and 60 to 40% by weight of cis-1,4-polybutadiene rubber, the rebound and the wet skid resistance are excellently balanced, but the tensile stress (300%) and the tensile strength are considerably poor compared with the conventional blend of styrene/butadiene copolymer rubber and polybutadiene rubber. The recent spread of radial-ply tires has aroused the desire for rubber material of tire treads having high tensile stress and higher tensile strength than that of such rubber material composed entirely of cis-1,4-polybutadiene.

The object of the present invention is therefore to provide a tire tread having reduced rolling resistance being a measure of low fuel consumption and increased wet skid resistance being a measure of high safety, with the mechanical properties, such as tensile stress and tensile strength, being unimpaired, as well as to provide a rubber composition for making such a tire tread.

Surprisingly, it has been found that when polybutadiene having a high 1,2-bond content; polybutadiene rubber; and styrene/butadiene copolymer rubber, natural rubber or high cis-1,4-polyisoprene rubber are blended in suitable proportions, the resulting three-component blend exhibits a marked balance between the rebound and the wet skid resistance, a remarkable reduction in the heat buildup as measured with a Goodrich flexometer (ASTM D623-52T), and a minimal reduction of the mechanical properties such as tensile stress and tensile strength.

Thus, according to the present invention, there is provided a rubber composition comprising 20 to 80% by weight of (I) essentially amorphous polybutadiene having a 1,2-bond units content of at least 70% and a Mooney viscosity ($ML_{L+4}$, 100° C.) of 10 to 100; 10 to 75% by weight of (II) polybutadiene rubber having a 1,2-bond units content of 20% or less and a Mooney viscosity ($ML_{1+4}$, 100° C.) of 20 to 130; and 3 to 35% by weight of (III) at least one rubber selected from styrene/butadiene copolymer rubber having a bound styrene content of 15 to 25% by weight, natural rubber, and polyisoprene rubber having a cis-1,4-bond units content of at least 90%.

The essentially amorphous polybutadiene (I) having a high content of 1,2-bond units in the present invention is obtained, for example, by the process described in U.S. Pat. No. 3,301,840 which comprises polymerizing 1,3-butadiene at a temperature of −80° C. to 150° C. in a hydrocarbon solvent such as benzene or cyclohexane with the use of an organolithium compound as a polymerization catalyst in the copresence of a polar compound such as ether or amine which serves as a regulator for 1,2-bond units. The content of 1,2-bond units in the resulting polymer is determined by infrared spectroscopic analysis usually employed in structural identification [L. Hampton, Analytical Chemistry, 21, 923 (1949)]. To attain the object of the present invention, the 1,2-bond units content of the polybutadiene (I) must be at least 70%. If that content is less than 70%, the rebound and heat build-up as measures of the rolling resistance are bettered, while the wet skid resistance is not expected to improve over the conventional composition, and the mechanical properties lower greatly. Preferably, that content is 85 to 95%. The Mooney viscosity ($ML_{1+4}$, 100° C.) of the polybutadiene (I) needs to be 10 to 100. If it is less than 10, the heat build-up and abrasion become great, thus making the resulting tire unsuitable for practical use. The Mooney viscosity exceeding 100 will worsen the kneadability and extrudability of the rubber composition, thus making it very difficult to mold the rubber composition into a tire. The preferred Mooney viscosity of the polybutadiene (I) is 30 to 60. The amount of the polybutadiene (I) used should be 20 to 80% by weight based on the entire rubber composition. Said amount less than 20% by weight will result in poor wet skid resistance, while that amount in excess of 80% by weight will cause great abrasion to tire, thus making it unsuitable for practical application. The preferred range of said amount is 30 to 60% by weight.

The polybutadiene rubber (II) having a low 1,2-bond units content used in the present invention is obtained by polymerizing 1,3-butadiene by emulsion polymerization or by solution polymerization using a transition metal catalyst, an organic alkali metal catalyst or the like. For the object of the present invention, the polybutadiene rubber (II) must have a 1,2-bond units content of 20% or less. That content higher than 20% will make the heat build-up and abrasion great, thus making the resulting tire composition unsuitable as a tire. The Mooney viscosity ($ML_{1+4}$, 100° C.) of the polybutadiene rubber (II) is 20 to 130. If it is less than 20, heat build-up and abrasion become great. If it is more than 130, the composition will have poor processability, and it is difficult to mold it into a tire. The preferred Mooney viscosity is 30 to 60. The amount of the polybutadiene rubber (II) used is 15 to 75% by weight of the entire rubber composition. If that amount is less than 15% by weight, the rebound is low. If it is more than 75% by weight, the wet skid resistance is poor thus making the rubber composition unusable in practice. The preferred range for the amount is 20 to 60% by weight.

The aforementioned rubber (III) is (1) styrene/butadiene copolymer rubber having a bound styrene content of 15 to 25% that is obtained by emulsion polymerization or solution polymerization, the solution polymerization using an organic alkali metal catalyst; (2) natural rubber; or (3) polyisoprene rubber having a cis-1,4-bond units content of at least 90% that is obtained by the solution polymerization of isoprene with the use of a transition metal catalyst or an organic alkali metal catalyst. The amount of the rubber (III) used is 3 to 35% by weight based on the entire rubber composition. If the amount is less than 3% by weight, improved mechanical properties such as tensile strength and tensile stress that the present invention is aimed at cannot be achieved. If said amount is more than 35% by weight, low abrasion resistance will result.

In some cases, each of the polybutadiene (I), the polybutadiene rubber (II) and the rubber (III) may contain 10 to 30%, based on the weight thereof, of an extender oil for rubber.

To the rubber composition of the present invention, it is possible, if desired, to add compounding agents widely used in the rubber industry, such as carbon black, process oil, sulfur, vulcanization accelerators, vulcanization aids, and anti-aging agents. The so obtained rubber composition can be molded easily into tire treads by an ordinary method.

The present invention will be illustrated in greater detail by reference to the Examples below.

EXAMPLE 1

100 Parts by weight of a rubber component and various compounding agents in the amounts shown in Table 1 were mixed by a B-type Banbury mixer (1.8 liters) to obtain various compositions.

Vulcanizates were prepared from the compositions that had been obtained by using as the rubber components styrene/butadiene copolymer rubber (NIPOL SBR-1502, a product of Nippon Zeon Co., Ltd., a bound styrene content: 23.5% by weight, $ML_{1+4}$, 100° C., 47.5), cis-1,4-polybutadiene rubber (NIPOL BR-1220, a product of Nippon Zeon Co., Ltd., cis-1,4-bond content: 98%, $ML_{1+4}$, 100° C. 40.0), a blend of the styrene/butadiene copolymer rubber and the cis-1,4-polybutadiene rubber (70:30), and a blend of the cis-1,4-polybutadiene rubber and polybutadiene having a 1,2-bond units content as high as 89.3% (20:80 to 80:20), respectively. The vulcanizates were prepared by vulcanizing the compositions at a temperature of 145° C. for a period ranging from 20 minutes to 45 minutes. The vulcanizates were measured for rebound, wet skid resistance, heat build-up by a Goodrich flexometer (ASTM D623-52T), 300% tensile modulus, tensile strength, elongation, and Pico abrasion. The results are shown in Table 2 (Control).

Vulcanized rubbers were similarly prepared from the compositions that had been obtained by using as the rubber components three-component blends consisting of polybutadiene having a high 1,2-bond units content (89.3%) ($ML_{1+4}$, 100° C. 42.5), cis-1,4-polybutadiene, and styrene/butadiene copolymer rubber. The vulcanized rubbers were tested for various properties, and the results are shown in Table 3 (Present Invention).

Said polybutadiene having a high 1,2-bond units content (89.3%) was prepared by polymerizing 1,3-butadiene at 90° C. by an ordinary solution polymerization process in cyclohexane in the presence of n-butyllithium as a catalyst and diethylene glycol dimethyl ether as a 1,2-bond units regulator.

TABLE 1

| | |
|---|---|
| Rubber component (see TABLES 2 and 3) | 100 parts by weight |
| Zinc oxide (No. 3) | 3 parts by weight |
| Stearic acid | 2 parts by weight |
| HAF carbon black | 50 parts by weight |
| High-aromatic oil | 5 parts by weight |
| Sulfur | Varying amount (see TABLES 2 and 3) |
| Vulcanization accelerator (N-cyclohexyl-2-benzothiazolesulfenamide) | Varying amount (see TABLES 2 and 3) |
| Anti-aging agent (N-phenyl-N-isopropyl-p-phenylenediamine) | 1 |
| Anti-aging agent (Phenyl-β-naphthylamine | 1 |

TABLE 2

| | Test No. | Control | | | | | | | |
|---|---|---|---|---|---|---|---|---|---|
| Test Item | | 1 | 2 | 3 | 4 | 5 | 6 | 7 | 8 |
| Rubber | Cis-1,4-polybutadiene rubber (II) | 100 | 30 | — | — | 20 | 40 | 60 | 80 |

TABLE 2-continued

| Test Item | | Test No. Control | | | | | | | |
|---|---|---|---|---|---|---|---|---|---|
| | | 1 | 2 | 3 | 4 | 5 | 6 | 7 | 8 |
| component | Styrene/butadiene copolymer rubber (III) | — | 70 | 100 | — | — | — | — | — |
| | High 1,2-bond units content polybutadiene (I)[1] | — | — | — | 100 | 80 | 60 | 40 | 20 |
| Sulfur | | 1.5 | 1.7 | 1.8 | 1.0 | 1.1 | 1.2 | 1.3 | 1.4 |
| Vulcanization accelerator | | 1.1 | 1.1 | 1.1 | 2.2 | 2.0 | 1.8 | 1.5 | 1.3 |
| Rebound (%)[2] | | 60 | 53.5 | 50 | 38 | 49 | 55 | 59 | 60 |
| Wet skid resistance[3] (on concrete) | | 30 | 37 | 41 | 50 | 48 | 43 | 38 | 32 |
| Heat build-up ΔT (°C.)[4] | | 35 | 31 | 31 | 27.5 | 31 | 32 | 32 | 32 |
| 300% tensile modulus (kg/cm$^2$) | | 94 | 120 | 136 | 101 | 103 | 107 | 104 | 102 |
| Tensile strength (kg/cm$^2$) | | 163 | 236 | 252 | 165 | 165 | 153 | 149 | 160 |
| Elongation (%) | | 440 | 490 | 490 | 430 | 430 | 370 | 390 | 420 |
| Pico abrasion (×10$^{-2}$CC)[5] | | 1.22 | 2.96 | 3.26 | 5.02 | 4.23 | 3.62 | 2.81 | 2.10 |

[1] 1,2-bond units 89.3%; cis-1,4-bond units 6.7%; trans-1,4-bond units 4.0%
[2] Ruepke rebound test at 25° C. (JIS K-6301)
[3] Measured at 25° C. with a portable skid tester (a product of Stanley Co., London)
[4] Measured at 100° C., 25 lb., 0.175 in. and 1800 rpm with a Goodrich flexometer (ASTM D623-52T)
[5] ASTM D2228

TABLE 3

| Test Item | | Test No. Present Invention | | | | | | | | | | | |
|---|---|---|---|---|---|---|---|---|---|---|---|---|
| | | 9 | 10 | 11 | 12 | 13 | 14 | 15 | 16 | 17 | 18 | 19 | 20 |
| Rubber Component | Cis-1,4-polybutadiene rubber (II) | 16 | 34 | 32 | 28 | 24 | 54 | 48 | 42 | 36 | 72 | 64 | 56 |
| | Styrene/butadiene copolymer rubber (III) | 4 | 6 | 8 | 12 | 16 | 6 | 12 | 18 | 24 | 8 | 16 | 24 |
| | High 1,2-bond units content polybutiene (I)[1] | 80 | 60 | 60 | 60 | 60 | 40 | 40 | 40 | 40 | 20 | 20 | 20 |
| Sulfur | | 1.1 | 1.2 | 1.2 | 1.2 | 1.2 | 1.3 | 1.3 | 1.3 | 1.4 | 1.4 | 1.4 | 1.5 |
| Vulcanization accelerator | | 2.0 | 1.8 | 1.8 | 1.8 | 1.8 | 1.5 | 1.5 | 1.5 | 1.5 | 1.3 | 1.3 | 1.3 |
| Rebound (%)[2] | | 47 | 55 | 54 | 53 | 50 | 58.5 | 57.5 | 56 | 53 | 59.5 | 59 | 58.5 |
| Wet skid resistance[3] (on concrete) | | 49 | 45 | 42 | 43 | 43 | 40 | 40 | 40 | 40 | 34 | 34 | 35 |
| Heat build-up ΔT(°C.)[4] | | 29 | 31 | 32 | 30 | 30 | 30 | 30 | 31 | 31 | 31 | 32 | 31 |
| 300% tensile modulus (kg/cm$^2$) | | 114 | 117 | 122 | 117 | 118 | 114 | 110 | 120 | 120 | 105 | 103 | 110 |
| Tensile strength (kg/cm$^2$) | | 170 | 161 | 172 | 165 | 182 | 165 | 168 | 175 | 185 | 164 | 168 | 170 |
| Elongation (%) | | 410 | 380 | 390 | 380 | 400 | 390 | 410 | 390 | 390 | 410 | 420 | 410 |
| Pico abrasion (× 10$^{-2}$CC)[5] | | 4.45 | 3.62 | 3.62 | 3.80 | 4.02 | 2.84 | 3.07 | 3.07 | 3.21 | 2.45 | 2.62 | 2.75 |

[1] to [5] Same as in TABLE 2

Data of Table 2 (Control) shows that the compositions of Test Nos. 4 to 8, in comparison with the compositions of Test Nos. 2 and 3 being the conventional typical rubber compositions for tire treads, are considerably high in rebound and wet skid resistance. This fact means that these compositions improve over the conventional compositions in terms of the balance between the rolling resistance and the wet skid resistance. The compositions of Test Nos. 6 and 7 particularly superior in the balance of said two properties, on the other hand, are slightly inferior in heat build-up and markedly inferior in 300% tensile modulus and tensile strength, to the compositions of Test Nos. 2 and 3 that are the conventional products.

Data of Table 3 (Present Invention) teaches that the compositions of the present invention are all excellent in the balance between the rebound and the wet skid resistance and, compared with the conventional compositions, are low in heat build-up and minimal in reduction of the tensile modulus and tensile strength.

EXAMPLE 2

Various compositions were prepared in the same way as in Example 1 with the use of three-component blends consisting of cis-1,4-polybutadiene rubber (II), polybutadiene (I) having a high 1,2-bond units content (89.3%) and natural rubber (RSS No. 3) (III) as the rubber components. Vulcanized rubbers were produced from the compositions, and measured for properties. The results are shown in Table 4.

TABLE 4

| Test Item | | Test No. Present Invention | | | | | | | | | | |
|---|---|---|---|---|---|---|---|---|---|---|---|
| | | 21 | 22 | 23 | 24 | 25 | 26 | 27 | 28 | 29 | 30 | 31 |
| Rubber Component | Cis-1,4-polybutadiene rubber (II) | 16 | 32 | 28 | 24 | 54 | 48 | 42 | 36 | 72 | 64 | 56 |
| | Natural rubber (III) | 4 | 8 | 12 | 16 | 6 | 12 | 18 | 24 | 8 | 16 | 24 |
| | High 1,2-bond units content polybutadiene (I)[1] | 80 | 60 | 60 | 60 | 40 | 40 | 40 | 40 | 20 | 20 | 20 |
| Sulfur | | 1.16 | 1.28 | 1.32 | 1.36 | 1.36 | 1.42 | 1.48 | 1.54 | 1.296 | 1.272 | 1.248 |
| Vulcanization accelerator | | 1.962 | 1.736 | 1.724 | 1.712 | 1.522 | 1.504 | 1.486 | 1.468 | 1.48 | 1.56 | 1.64 |
| Rebound (%)[2] | | 47.5 | 55.5 | 55.5 | 52 | 60.5 | 60 | 59.5 | 58 | 60 | 60 | 59.4 |
| Wet skid resistance[3] (on concrete) | | 46 | 42 | 43 | 43 | 39 | 39 | 40 | 40 | 32 | 32 | 33 |

TABLE 4-continued

| Test Item | Test No. | Present Invention | | | | | | | | | |
|---|---|---|---|---|---|---|---|---|---|---|---|
| | | 21 | 22 | 23 | 24 | 25 | 26 | 27 | 28 | 29 | 30 | 31 |
| Heat build-up ΔT(°C.)[4] | | 29 | 28 | 28 | 27 | 28 | 27 | 27 | 27 | 29 | 27 | 27 |
| 300% tensile modulus (kg/cm$^2$) | | 112 | 108 | 111 | 112 | 110 | 112 | 115 | 120 | 108 | 115 | 120 |
| Tensile strength (kg/cm$^2$) | | 160 | 163 | 160 | 165 | 165 | 166 | 162 | 165 | 166 | 162 | 165 |
| Elongation (%) | | 400 | 400 | 380 | 380 | 410 | 410 | 390 | 390 | 420 | 410 | 430 |
| Pico abrasion ($\times 10^{-2}$ CC)[5] | | 4.47 | 3.78 | 3.98 | 4.12 | 3.07 | 3.17 | 3.29 | 3.52 | 2.51 | 2.70 | 1.82 |

[1] to [5] Same as in TABLE 2

As is apparent from the results of Table 4, the compositions of the present invention have a remarkably improved balance of the rebound and the wet skid resistance. The compositions of Test Nos. 22 to 24 and 25 to 28, in particular, have heat build-up that is very low, tensile stress whose reduction is minimum, and tensile strength that is maintained at 160 kg/cm$^2$ or more.

EXAMPLE 3

Various compositions (Present Invention) were prepared in the same way as in Example 1 using three-component blends consisting of cis-1,4-polybutadiene rubber (II), polybutadiene (I) having a high 1,2-bond units content (71.8%) (ML$_{1+4}$, 100° C. 43.0) and styrene/butadiene copolymer rubber (III) as the rubber components. Vulcanized rubbers were produced from the compositions, and measured for properties.

Various compositions (Control) were prepared in the same manner as in Example 1 using two-component blends consisting of cis-1,4-polybutadiene rubber (II) and polybutadiene (I) having a high 1,2-bond units content (71.8%) or polybutadiene having a low 1,2-bond units content (49.7%) (ML$_{1+4}$, 100° C. 43.5). Vulcanized rubbers were produced from the compositions, and measured for properties.

The results are shown in Table 5.

TABLE 5

| Test Item | | Test No. | Control | | | | | | Present Invention | | |
|---|---|---|---|---|---|---|---|---|---|---|---|
| | | | 32 | 33 | 34 | 35 | 36 | 37 | 38 | 39 | 40 |
| Rubber Component | Cis-1,4-polybutadiene rubber (II) | | 20 | 40 | 60 | 20 | 40 | 60 | 15 | 24 | 48 |
| | Styrene/butadiene copolymer rubber (III) | | — | — | — | — | — | — | 5 | 16 | 12 |
| | High 1,2-bond units content polybutadiene (I)[6] | | 80 | 60 | 40 | — | — | — | 80 | 60 | 40 |
| | Low 1,2-bond units content polybutadiene[7] | | — | — | — | 80 | 60 | 40 | — | — | — |
| Sulfur | | | 1.1 | 1.2 | 1.3 | 1.1 | 1.2 | 1.3 | 1.1 | 1.2 | 1.3 |
| Vulcanization accelerator | | | 2.0 | 1.8 | 1.5 | 2.0 | 1.8 | 1.5 | 2.0 | 1.8 | 1.5 |
| Rebound (%)[2] | | | 51 | 57 | 60 | 57.5 | 59 | 60.5 | 49 | 53 | 57 |
| Wet skid resistance[3] (on concrete) | | | 45 | 40 | 36 | 40 | 38 | 35 | 46 | 42 | 38 |
| Heat build-up ΔT(°C.)[4] | | | 31 | 32 | 32 | 30 | 31 | 31 | 30 | 31 | 33 |
| 300% tensile modulus (kg/cm$^2$) | | | 100 | 101 | 98 | 83 | 89 | 95 | 111 | 114 | 110 |
| Tensile strength (kg/cm$^2$) | | | 153 | 149 | 145 | 140 | 143 | 145 | 162 | 170 | 158 |
| Elongation (%) | | | 420 | 380 | 390 | 400 | 410 | 400 | 420 | 420 | 400 |
| Pico abrasion ($\times 10^{-2}$ CC)[5] | | | 4.10 | 3.53 | 2.68 | 2.95 | 2.44 | 2.23 | 4.30 | 3.81 | 2.78 |

[2] to [5] Same as in TABLE 2
[6] 1,2-bond units 71.8%; cis-1,4-bond units 6.2% trans-1,4-bond units 22.0%
[7] 1,2-bond units 49.7%; cis-1,4-bond units 13.9% trans-1,4-bond units 36.8%

From the results of Table 5, it is seen that the compositions of the present invention, as compared with the compositions of the Control, have a good balance between the rebound and the wet skid resistance, and improvements in the tensile modulus and the tensile strength.

What is claimed is:

1. A rubber composition for the tread of tire having reduced rolling resistance and increased wet skid resistance with the mechanical properties unimpaired, said rubber composition comprising 20 to 80% by weight of (I) essentially amorphous polybutadiene having a 1,2-bond units content of at least 70% and a Mooney viscosity (ML$_{1+4}$, 100° C.) of 10 to 100; 10 to 75% by weight of (II) polybutadiene rubber having a 1,2-bond units content of 20% or less and a Mooney viscosity (ML$_{1+4}$, 100° C.) of 20 to 130; and 3 to 35% by weight of (III) at least one rubber selected from styrene/butadiene copolymer rubber having a bound styrene content of 15 to 25% by weight, natural rubber, and polyisoprene rubber having a cis-1,4-bond units content of at least 90%.

2. A rubber composition for tire tread as recited in claim 1, wherein the rubber composition comprises 30 to 60% by weight of the essentially amorphous polybutadiene (I) having a 1,2-bond units content of 85 to 95% and a Mooney viscosity (ML$_{1+4}$, 100° C.) of 30 to 60; 20 to 60% by weight of the polybutadiene rubber (II) having a 1,2-bond units content of 20% or less and a Mooney viscosity (ML$_{1+4}$, 100° C.) of 30 to 60 and being obtained by solution polymerization; and 5 to 25% by weight of at least one rubber (III) selected from styrene/butadiene copolymer rubber having a bound styrene content of 15 to 25% by weight, natural rubber, and polyisoprene rubber having a cis-1,4-bond units content of at least 90%.

3. A rubber composition for tire tread as recited in claim 1 or 2, wherein at least one of the polybutadiene (I), the polybutadiene rubber (II) and the rubber (III) contains 10 to 30%, based on the weight thereof, of an extender oil for rubber.

* * * * *